United States Patent
Szumski et al.

(10) Patent No.: US 9,868,272 B2
(45) Date of Patent: Jan. 16, 2018

(54) CARD ASSEMBLY AND METHOD OF MANUFACTURING THE SAME

(71) Applicant: Illinois Tool Works Inc., Glenview, IL (US)

(72) Inventors: Daniel M. Szumski, Saint John, IN (US); Roger Strasemeier, Sauk Village, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/853,393

(22) Filed: Sep. 14, 2015

(65) Prior Publication Data

US 2016/0089865 A1     Mar. 31, 2016

Related U.S. Application Data

(60) Provisional application No. 62/057,462, filed on Sep. 30, 2014.

(51) Int. Cl.

| | | |
|---|---|---|
| *G06K 19/02* | (2006.01) | |
| *B32B 27/20* | (2006.01) | |
| *B32B 27/08* | (2006.01) | |
| *B32B 7/12* | (2006.01) | |
| *B32B 37/12* | (2006.01) | |
| *B32B 37/14* | (2006.01) | |
| *G06K 19/077* | (2006.01) | |

(Continued)

(52) U.S. Cl.
CPC ............ *B32B 27/20* (2013.01); *B32B 7/12* (2013.01); *B32B 27/08* (2013.01); *B32B 37/12* (2013.01); *B32B 37/14* (2013.01); *B42D 25/23* (2014.10); *B42D 25/351* (2014.10); *B42D 25/47* (2014.10); *B42D 25/475* (2014.10); *G06K 19/07722* (2013.01); *B32B 2307/4026* (2013.01); *B32B 2425/00* (2013.01)

(58) Field of Classification Search
USPC .......................... 235/375, 380, 451, 488, 492
See application file for complete search history.

(56) References Cited

U.S. PATENT DOCUMENTS

| | | | | |
|---|---|---|---|---|
| 4,151,666 A | * | 5/1979 | Raphael ........... | G06K 19/06046 283/108 |
| 4,626,669 A | * | 12/1986 | Davis ..................... | G06K 19/10 235/380 |

(Continued)

FOREIGN PATENT DOCUMENTS

WO     2005062978     7/2005

OTHER PUBLICATIONS

International Search Report for Application No. PCT/US2015/050162 dated Dec. 8, 2015. (14 pages).

*Primary Examiner* — Tuyen K Vo
(74) *Attorney, Agent, or Firm* — Christopher R. Carroll; The Small Patent Law Group LLC (57) ABSTRACT

A laminate assembly and method for manufacturing a laminate assembly for a card assembly is provided. The assembly includes a top coat layer, a carrier layer connected with the top coat layer, and a colored core coupled by an adhesive layer. One or more of the adhesive layer or the top coat layer includes a colorant of a second color that is different from the first color of the colored core such that the first color of the colored core less not visible through the printed surface of the top coat layer.

19 Claims, 3 Drawing Sheets

(51) Int. Cl.
   *B42D 25/23*    (2014.01)
   *B42D 25/351*   (2014.01)
   *B42D 25/47*    (2014.01)
   *B42D 25/475*   (2014.01)

(56) References Cited

U.S. PATENT DOCUMENTS

| | | | | |
|---|---|---|---|---|
| 5,663,033 | A * | 9/1997 | Warner | G03F 7/34 |
| | | | | 430/253 |
| 5,691,876 | A * | 11/1997 | Chen | H01L 21/6833 |
| | | | | 361/234 |
| 6,636,332 | B1 * | 10/2003 | Soscia | H04N 1/32144 |
| | | | | 358/296 |
| 6,644,552 | B1 * | 11/2003 | Herslow | B32B 27/08 |
| | | | | 235/488 |
| 2005/0040243 | A1 | 2/2005 | Bi et al. | |
| 2005/0067497 | A1 * | 3/2005 | Jones | G06K 19/02 |
| | | | | 235/492 |
| 2005/0118396 | A1 * | 6/2005 | Isherwood | B41M 3/14 |
| | | | | 428/164 |
| 2005/0257880 | A1 | 11/2005 | Herring et al. | |
| 2005/0259326 | A1 * | 11/2005 | Weber | B32B 7/12 |
| | | | | 359/589 |
| 2006/0249951 | A1 * | 11/2006 | Cruikshank | B42D 25/351 |
| | | | | 283/92 |
| 2007/0187054 | A1 * | 8/2007 | Koike | B32B 27/32 |
| | | | | 162/123 |
| 2008/0018098 | A1 * | 1/2008 | Crum | B42D 15/02 |
| | | | | 283/114 |
| 2009/0020615 | A1 * | 1/2009 | Patel | G06K 19/077 |
| | | | | 235/492 |
| 2009/0294543 | A1 * | 12/2009 | Varga | G06K 19/02 |
| | | | | 235/492 |
| 2011/0031319 | A1 * | 2/2011 | Kiekhaefer | G06K 19/02 |
| | | | | 235/492 |
| 2011/0045255 | A1 | 2/2011 | Jones et al. | |
| 2011/0192532 | A1 * | 8/2011 | Tenyer | B32B 7/12 |
| | | | | 156/250 |
| 2013/0300101 | A1 * | 11/2013 | Wicker | G07D 7/0093 |
| | | | | 283/67 |
| 2014/0224881 | A1 * | 8/2014 | Herslow | G06K 19/02 |
| | | | | 235/488 |
| 2015/0041546 | A1 * | 2/2015 | Herslow | G06K 19/02 |
| | | | | 235/492 |

* cited by examiner

CARD ASSEMBLY AND METHOD OF MANUFACTURING THE SAME

CROSS-REFERENCE TO RELATED APPLICATIONS

This application claims priority to U.S. Provisional Application No. 62/057,462, which was filed on 30 Sep. 2014, and the entire disclosure of which is incorporated herein by reference.

BACKGROUND

Laminated sheets and cards are used in a variety of applications, such as financial transaction cards (e.g., credit or debit cards, phone cards, gift cards, loyalty cards, etc.), security cards (e.g., identification cards), and the like. Some known sheets and cards may be formed from multiple layers of plastic based substrates, adhesives and coatings, among other layers. The cards also may include printing, graphics, and/or other features.

Some cards are desired to have a core layer that is a different color from films disposed on opposite, visible sides of the core layer. Different colors may be used to represent or correspond to logos, color schemes, or the like, of suppliers or purveyors of the cards. The color of the core layer may bleed through and be visible on the surface of the cards.

One attempted solution to preventing the color of the core from changing the color of the surface is to print a thick layer of white pigmented coating onto the core beneath the surface. But, adding this printed layer of pigments adds to the cost and complexity of the cards, and can weaken the coupling between the core and the surface films.

Another attempted solution is to use a thick, white polymer layer between the core and surface films of the card. But, adding such a thick, white layer can create a visibly noticeable white layer in the side view or profile view of the card. This can be undesirable to some card providers if the color white is not to be included in the overall design and appearance of the card.

BRIEF DESCRIPTION

In one embodiment, a laminate assembly for a card assembly is provided. The assembly includes a top coat layer, a carrier layer connected with the top coat layer, and a colored core coupled by an adhesive layer. One or more of the adhesive layer or the top coat layer includes a colorant of a second color that is different from the first color of the colored core such that the first color of the colored core has decreased visibility through the printed surface of the top coat layer. For example, the colorant of the second color may cause the first color of the colored core to be less visible through the printed surface of the top coat layer to a human being without aid of magnification relative to a laminate assembly that does not include the colorant in the adhesive layer and/or top coat. Optionally, the first color of the colored core may not be visible through the printed surface of the top coat layer.

In one aspect, a sum of a thickness dimension of the top coat and a thickness dimension of the adhesive layer may be no greater than one and a half mils along a side of the laminate assembly.

In one aspect, the laminate assembly also can include an overlay layer on the top coat layer. A thickness dimension of the colored core, the carrier layer, the adhesive layer and the top coat layer may be thirty-three mils or less.

In one aspect, the colored core includes one or more of polyvinyl chloride (PVC), recycled PVC, polyethylene terephthalate (PET), polycarbonate (PC), polyethylene terephthalate glycol-modified (PETG), polyactide (PLA), or another polymer.

In one aspect, the colored core may have a thickness dimension that is no larger than thirty mils.

In one aspect, the adhesive layer may be formed from one or more of a polyurethane dispersion (PUD), an acrylic material, a vinyl material, or another polymer material.

In one aspect, the adhesive layer includes colorants dispersed within the adhesive layer.

In one aspect, the top coat layer includes colorants dispersed within the top coat layer.

In another embodiment, a card assembly includes plural laminate assemblies coupled with each other. Each of the laminate assemblies can include a top coat layer, a carrier layer connected with the top coat layer, and a colored core coupled with an adhesive layer. One or more of the adhesive or the top coat layer includes a colorant of a second color that is different from the first color of the colored core such that the first color of the colored core may be less visible through the printed surface of the top coat layer. For example, the colorant of the second color may cause the first color of the colored core to be less visible through the printed surface of the top coat layer to a human being without aid of magnification relative to a laminate assembly that does not include the colorant in the adhesive layer and/or top coat. Optionally, the first color of the colored core may not be visible through the printed surface of the top coat layer In one aspect, one or more of the adhesive or the top coat layer has a thickness dimension that is no greater than one and a half mils.

In one aspect, a thickness dimension of the colored core, the carrier layer, the adhesive layer, and the top coat layer in each of the laminate assemblies is thirty-three mils or less.

In one aspect, the colored core in each of the laminate assemblies includes one or more of polyvinyl chloride (PVC), polyethylene terephthalate (PET), polycarbonate (PC), polyethylene terephthalate glycol-modified (PETG), polyactide (PLA), or another polymer.

In one aspect, the colored core in each of the laminate assemblies has a thickness dimension that is no larger than thirty mils.

In one aspect, the adhesive layer in each of the laminate assemblies is formed from one or more of a polyurethane dispersion (PUD), an acrylic material, a vinyl material, or another polymer.

In one aspect, the adhesive layer in each of the laminate assemblies includes colorants dispersed within the adhesive layer.

In one aspect, the top coat layer in each of the laminate assemblies includes colorants dispersed within the top coat layer.

In one aspect, the assembly also includes a circuit layer disposed between the laminate assemblies, with the circuit layer including one or more electronic circuits.

In another embodiment, a method (e.g., for forming a laminate assembly) includes obtaining a carrier layer having printable surfaces, applying a top coat layer to the carrier layer, applying an adhesive layer, and laminating the carrier layer and the top coat layer to a colored core film using the adhesive layer. The colored core has a first color, and one or more of the adhesive or the top coat layer includes a colorant of a second color that is different from the first color of the colored core such that the first color of the colored core is less visible through the printed surface of the top coat layer. For example, the colorant of the second color may cause the first color of the colored core to be less visible through the printed surface of the top coat layer to a human being without aid of magnification relative to a laminate assembly that does not include the colorant in the adhesive layer and/or top coat. Optionally, the first color of the colored core may not be visible through the printed surface of the top coat layer In one aspect, the method also includes dispersing colorants within the adhesive layer.

In one aspect, the method also includes dispersing colorants within the top coat layer.

In one aspect, the method also includes coupling the first laminate assembly with a second laminate assembly and cutting one or more card assemblies from the first laminate assembly and the second laminate assembly.

In one aspect, the first laminate assembly is coupled with the second laminate assembly by a circuit layer having one or more electronic circuits disposed therein.

BRIEF DESCRIPTION OF THE DRAWINGS

The present inventive subject matter will be better understood from reading the following description of non-limiting embodiments, with reference to the attached drawings (which are not necessarily drawn to scale), wherein below.

DETAILED DESCRIPTION

Figure 1:
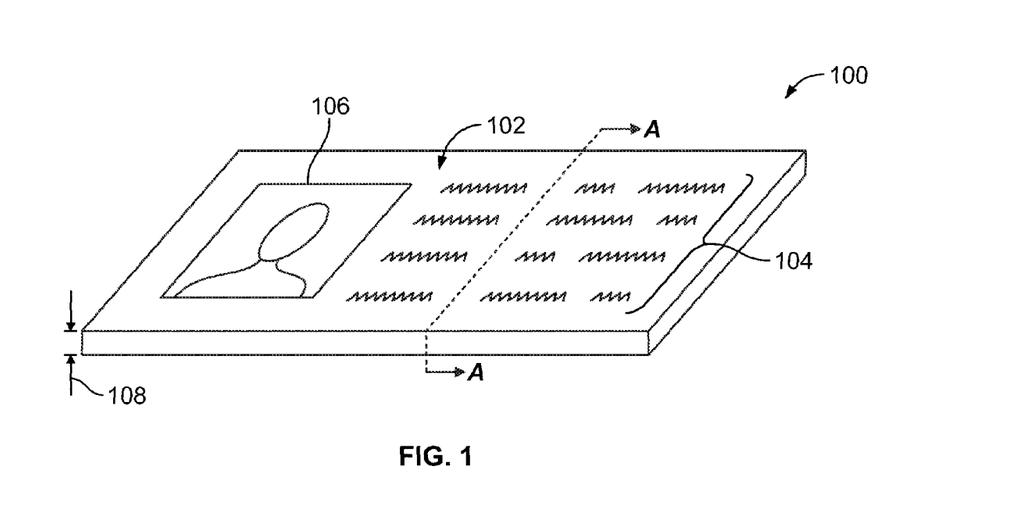
FIG. 1 is a perspective view of a finished card assembly according to one example of the subject matter described herein.

FIG. 1 is a perspective view of a finished card assembly 100 formed in accordance with one example of the inventive subject matter described herein. The card assembly 100 may be used in a variety of applications, such as a financial transaction card (e.g., credit or debit card, phone card, gift card, loyalty card, etc.), a security card (e.g., identification card), and the like. The card assembly 100 includes a visible surface or side 102 on which information may be printed or otherwise shown. For example, the surface or side 102 may include text and/or numbers 104, images 106, and the like, that indicate a use of the card assembly 100, an owner of the card assembly 100, an institution that issued and/or accepts the card assembly 100, etc. As described below, one or more overlay layers may be disposed on top of the side 102 to protect the information printed thereon without significantly obstructing visibility of the information.

The card assembly 100 is formed from several planar layers or films that are coupled together. These layers or films can be stacked on top of each other to generate a thickness dimension 108 of the card assembly 100. One or more of the layers or films (e.g., a core substrate or layer) may be thicker than other layers or films, and can have a different color than other layers or films, and/or the surface 102 of the card assembly 100, the text and/or numbers 104, and/or images 106 on the card assembly 100. As described herein, other layers or films in the thickness dimension 108 of the card assembly 100 may be used to prevent or block the color of the core substrate or layer from being visible or changing the color of the surface 102 of the card assembly 100, the text and/or numbers 104, and/or images 106 on the card assembly 100, without being visible in the thickness dimension 108 of the card assembly 100.

Figure 2:
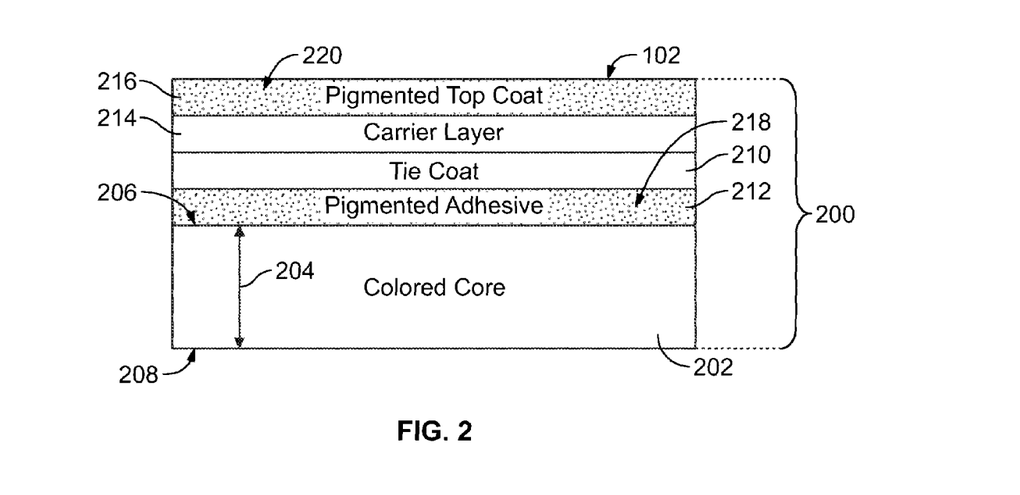
FIG. 2 illustrates a cross-sectional view of a laminate assembly that can be used to form at least part of the card assembly shown in FIG. 1 according to one example of the subject matter described herein.

FIG. 2 illustrates a cross-sectional view of a laminate assembly 200 that can be used to form at least part of the card assembly 100 shown in FIG. 1 according to one example of the subject matter described herein. For example, two of the laminate assemblies 200 can be laminated together to form the card assembly 100, as described below. The laminate assembly 200 includes a colored core 202, which also can be referred to as a core substrate or layer. The colored core 202 may be the thickest layer or film of the laminate assembly 200, or may be thicker than one or more of the other layers or films in the laminate assembly 200. The colored core 202 has a thickness dimension 204 that is measured between opposite sides 206, 208 of the colored core 202. In one embodiment, the total thickness dimension of the card assembly 100 may be no larger than thirty-three mils (e.g., no larger than 838 microns, or another dimension), with the thickness dimension 204 being at least five mils (e.g., at least 127 microns) and/or no greater than thirty mils (e.g., no greater than 762 microns). Alternatively, the colored core film 202 may have a different thickness dimension 204, such as a thickness dimension 204 that is less than five mils, that is thicker than thirty-two mils, that is larger than five mils but less than thirty-three mils, or the like. The colored core film 202 can be formed from one or more polymer materials. Examples of these materials include, but are not limited to, polyvinyl chloride (PVC), polyethylene terephthalate (PET), polycarbonate (PC), polyethylene terephthalate glycol-modified (PETG), or the like.

Because the colored core 202 has a larger thickness than one or more, or all other, layers in the laminate assembly 200, the color of the colored core 202 may be visible in the thickness dimension 108 of the card assembly 100 when viewing the card assembly 100 from the side. Some providers of card assemblies 100 can incorporate this color into the design of the card assembly 100, such as by having a primary or secondary color in the design of a company logo be the same color as the colored core 202.

In one embodiment, the adhesive layer 212 may include or be formed from a polyurethane dispersion (PUD), an acrylic material, a vinyl material, or another material that couples a tie coat layer 210 to the colored core 202. The tie coat layer 210 may be a layer formed from acrylic, polyurethane, a vinyl material, or the like. The tie coat layer 210 increases the bond strength of the carrier layer 214 to the adhesive 212. Alternatively, the tie coat layer 210 may not be included in the assembly 100 and/or the assembly 200. In one aspect, the adhesive layer 212 may include colorants 218 dispersed within the adhesive layer 212 to provide a color to the adhesive layer 212. The colorants 218 can include pigments, dyes, or other materials that provide color to an object on or in which the colorants 218 are disposed. For example, colorants 218 that provide a white or other color to the adhesive layer 212 may be included in the adhesive layer 212 to assist in preventing the color of the colored core 202 from being visible outside of the card assembly 100 that is formed from at least one of the laminate assemblies 200 and/or from changing the color or appearance of the surface 102 of the card assembly 100, the text and/or numbers 104, and/or images 106 on the card assembly 100. In one embodiment, instead of the colorants 218 being disposed on exterior surfaces of the adhesive layer 212 (such as would occur with printing an ink on the adhesive layer 212), the colorants 218 are located inside the thickness of the adhesive layer 212, between the opposite exterior sides of the adhesive layer 212. The adhesive layer 212 may be sufficiently thin (e.g., less than five mils or another thickness) to prevent the colorants 218 from being visible in the thickness dimension 108 of the card assembly 100 to an average human being without the aid of magnification.

The carrier layer 214 can be formed from one or more polymer materials, such as PET, PVC, PC, PETG, or the like. The carrier layers also include a top coat layer 216 ("Pigmented Top Coat" in FIG. 2). The top coat layer 216 can provide a print receptive layer of the laminate assembly 200, such as the layer that includes the surface 102 of the card assembly 100 on which the text and/or numbers 104, images 106, or the like, are printed for the card assembly 100. The top coat layer 216 can be formed from one or more polymers, such as one or more acrylic materials, vinyl materials, or the like.

In one aspect, the top coat layer 216 may include colorants 220 dispersed within the top coat layer 216 to provide a color to the top coat layer 216. For example, colorants 220 that are the same or similar to the colorants 218 in the adhesive layer 212 may be included in the top coat layer 216 to provide a white or other color to the top coat layer 216. In one embodiment, instead of the colorants 220 being disposed on exterior surfaces of the top coat layer 216 (such as would occur with printing an ink on the top coat layer 216), the colorants 220 are located inside the thickness of the top coat layer 216, between the opposite exterior sides of the top coat layer 216. These colorants 220 may be included in the top coat layer 216 to assist in preventing the color of the colored core 202 from being visible through the surface 102 of the card assembly 100 that is formed from at least one of the laminate assemblies 200 and/or from changing the color or appearance of the surface 102 of the card assembly 100, the text and/or numbers 104, and/or images 106 on the card assembly 100. The top coat layer 216 may be sufficiently thin (e.g., less than five microns or another thickness) to prevent the colorants 220 from being visible in the thickness dimension 108 of the card assembly 100 to an average human being without the aid of magnification.

In one embodiment, the combination of the top coat 216 and the adhesive 212 can provide a degree of opacity that prevents the color of the colored core 202 from being visible through the surface 102 or changing the color of the text 104 and/or images 106 printed on the surface 102. Alternatively, only one of the top coat 216 or adhesive 212 includes the colorants 218, 220.

The laminate assembly 200 may be formed according to one or more embodiments of the following method. The carrier layer 214 may be obtained with printable polymer coatings on one or both sides of the carrier layer 214. The tie coat layer 210 may then be applied to the carrier layer 214 and a colored coating (e.g., white or other color coating) may be applied to the opposite side of the carrier layer 214 as the top coat layer 216. Alternatively, the tie coat layer 210 may not be included, similar to as described above. A wet adhesive may be applied to the tie coat layer 210 as the adhesive layer 212. This adhesive may be used to laminate the tie coat layer 210, the carrier layer 214, and the top coat layer 216 to the colored core layer 202.

Figure 3:
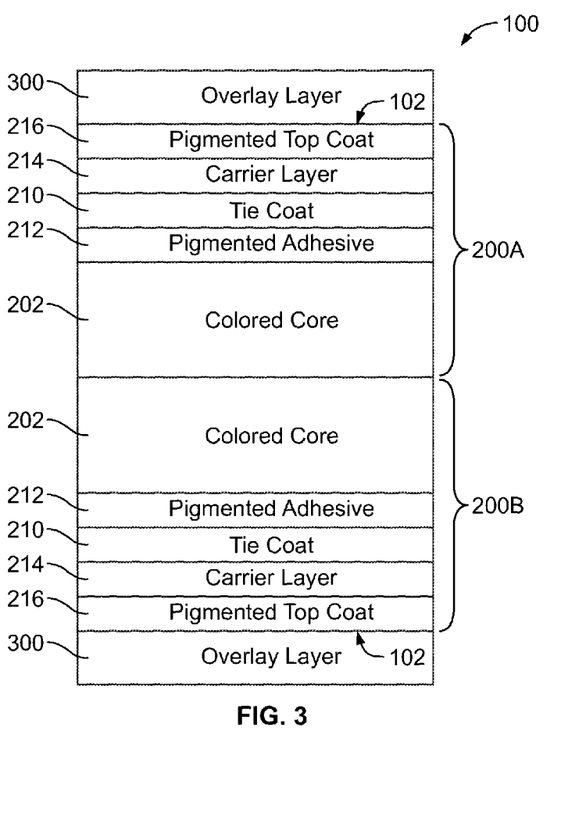
FIG. 3 illustrates a cross-sectional view of the card assembly along line A-A shown in FIG. 1 according to one example of the subject matter described herein.

FIG. 3 illustrates a cross-sectional view of the card assembly 100 along line A-A shown in FIG. 1 according to one embodiment. The card assembly 100 may include two of the laminate assemblies 200 (e.g., laminate assemblies 200A, 200B) bonded together, such as by laminating the laminate assemblies 200 together (e.g., at least partially melting the colored core films 202 together, placing an adhesive between the colored core films 202, etc.). Information may be printed on one or both of the surfaces 102 of the laminate assemblies 200, with the color of the colored core 202 blocked from being visible through the surfaces 102 by the adhesive layer 212 and/or the top coat 216. Overlay layers 300 may be disposed on the surfaces 102 of the top coats 216 in the laminate assemblies 200A, 200B. The overlay layers 300 may be clear or substantially clear such that the information printed on the top coats 216 is visible through the overlay layers 300. The overlay layers 300 may be between one and three mils thick (or another dimension), and may be formed from one or more polymer materials. The laminate assemblies 200 can be bonded together and several card assemblies 100 can be cut or otherwise separated from the bonded laminate assemblies 200.

Figure 4:
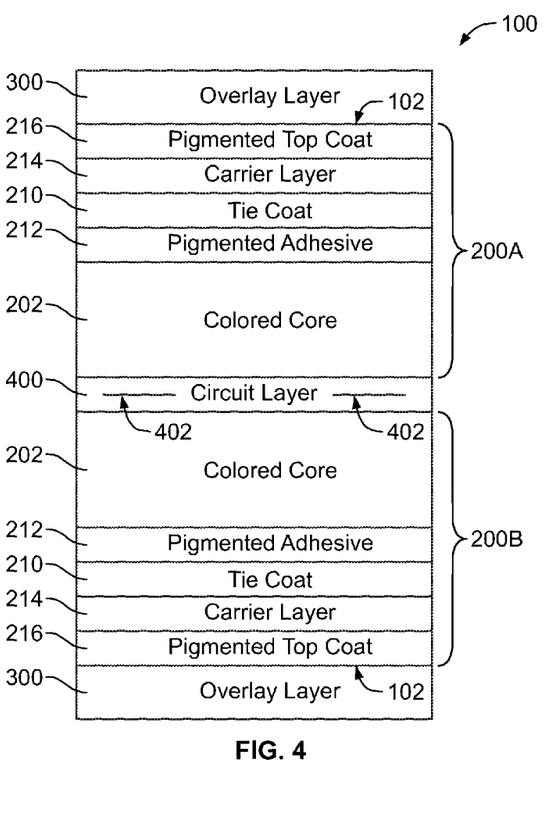
FIG. 4 illustrates a cross-sectional view of the card assembly along line A-A shown in FIG. 1 according to another example of the subject matter described herein.

FIG. 4 illustrates a cross-sectional view of the card assembly 100 along line A-A shown in FIG. 1 according to another embodiment. In contrast to the card assembly 100 shown in FIG. 3, the embodiment of the card assembly 100 shown in FIG. 4 includes a circuit layer 400 disposed between and bonded with the laminate assemblies 200A, 200B. The circuit layer 400 can represent a layer formed from one or more polymers or other materials, with one or more electronic circuits 402 disposed therein. In one aspect, the circuit layer 400 can include a radio frequency identification (RFID) antenna and associated circuitry that allow for the card assembly 100 to communicate information with an RFID reader. Optionally, another type of electronic circuit or circuitry 402 may be included in the circuit layer 400. The adhesive layer 212 and/or the top coat 216 can prevent the circuitry in the circuit layer 400 from being visible through the surfaces 102 and overlay layers 300 of the card assembly 100. The laminate assemblies 200A, 200B can be coupled with the circuit layer 400 similar to as described above in connection with FIG. 3 with respect to coupling the laminate assemblies 200A, 200B with each other.

Figure 5:
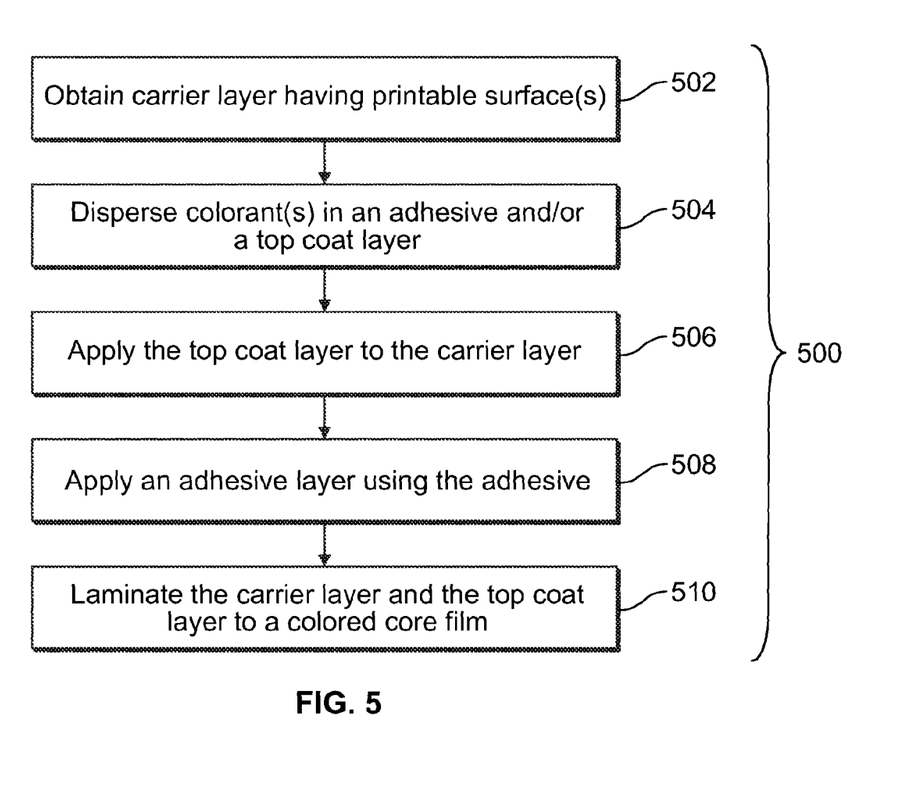
FIG. 5 illustrates a flowchart of a method for forming a laminate assembly for use in forming a card assembly according to one example.

FIG. 5 illustrates a flowchart of a method 500 for forming a laminate assembly for use in forming a card assembly according to one example. The method 500 may be used to form one or more of the laminate assemblies and/or card assemblies described herein. At 502, a carrier layer is obtained. The carrier layer includes one or more printable surfaces, as described above. At 504, one or more colorants are dispersed within an adhesive material and/or a top coat layer. As described above, these colorants assist in making a color of a core film of the laminate assembly difficult or impossible to see from a top and/or bottom surface of the card assembly that is formed from one or more of the laminate assemblies. At 506, the top coat layer is applied to the carrier layer. At 508, an adhesive layer is applied to the top coat layer using the adhesive. At 510, the carrier layer and the top coat layer are laminated to a colored core film. As described above, the colored core film may have a color that is different from the color of the adhesive layer and/or the top coat layer such that the colored core film is less visible or is not visible through the top and/or bottom surfaces of the card assembly formed from one or more of the laminate assemblies.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112(f), unless and until such clause limitations expressly use the phrase "means for" followed by a statement of function void of further structure. For example, the recitation of a "mechanism for," "module for," "device for," "unit for," "component for," "element for," "member for," "apparatus for," "machine for," or "system for" is not to be interpreted as invoking 35 U.S.C. §112(f), and any claim that recites one or more of these terms is not to be interpreted as a means-plus-function claim.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the clauses, and may include other examples that occur to one of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the present inventive subject matter will be better understood when read in conjunction with the appended drawings. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A laminate assembly for a card assembly, the laminate assembly comprising:
    a top coat layer;
    a carrier layer connected with the top coat layer;
    a colored core of a first color coupled by an adhesive layer to the carrier layer, wherein one or more of the adhesive layer or the top coat layer includes a colorant of a second color that is different from the first color;
    wherein the first color of the colored core is not visible through a printed surface of the top coat layer; and
    wherein a sum of a thickness dimension of the top coat layer and a thickness dimension of the adhesive layer is no greater than one and a half mils along a side of the laminate assembly.

2. The laminate assembly of claim 1, further comprising an overlay layer on the top coat layer, wherein a thickness dimension of the colored core, the carrier layer, the adhesive layer and the top coat layer is thirty-three mils or less.

3. The laminate assembly of claim 1, wherein the colored core includes one or more of polyvinyl chloride (PVC), recycled PVC, polyethylene terephthalate (PET), polycarbonate (PC), polyethylene terephthalate glycol-modified (PETG), or polyactide (PLA).

4. The laminate assembly of claim 1, wherein the colored core has a thickness dimension that is no larger than thirty mils.

5. The laminate assembly of claim 1, wherein the adhesive layer is formed from one or more of a polyurethane dispersion (PUD), an acrylic material, a vinyl material, or another polymer material.

6. The laminate assembly of claim 1, wherein the adhesive layer includes one or more colorants dispersed within the adhesive layer.

7. The laminate assembly of claim 1, wherein the top coat layer includes one or more colorants dispersed within the top coat layer.

8. A card assembly comprising:
    plural laminate assemblies coupled with each other; and
    a circuit layer disposed between the laminate assemblies, the circuit layer including one or more electronic circuits, wherein each of the laminate assemblies comprises:
        a top coat layer;
        a carrier layer connected with the top coat layer; and
        a colored core of a first color coupled with an adhesive layer to the carrier layer, wherein one or more of the adhesive or the top coat layer includes a colorant of a second color that is different from the first color of the colored core such that the first color of the colored core is less visible through the printed surface of the top coat layer compared to a laminate assembly having the top coat layer, the carrier layer, the colored core layer, and the adhesive without the colorant being included in the adhesive layer or the top coat layer.

9. The card assembly of claim 8, wherein one or more of the adhesive or the top coat layer has a thickness dimension that is no greater than one and a half mils.

10. The card assembly of claim 8, wherein a thickness dimension of the colored core, the carrier layer, the adhesive layer, and the top coat layer in each of the laminate assemblies is thirty-three mils or less.

11. The card assembly of claim 8, wherein the colored core in each of the laminate assemblies includes one or more of polyvinyl chloride (PVC), polyethylene terephthalate (PET), polycarbonate (PC), polyethylene terephthalate glycol-modified (PETG), or polyactide (PLA).

12. The card assembly of claim 8, wherein the colored core in each of the laminate assemblies has a thickness dimension that is no larger than thirty mils.

13. The card assembly of claim 8, wherein the adhesive layer in each of the laminate assemblies is formed from one or more of a polyurethane dispersion (PUD), an acrylic material, a vinyl material, or another polymer.

14. The card assembly of claim 8, wherein the adhesive layer in each of the laminate assemblies includes one or more colorants dispersed within the adhesive layer.

15. The card assembly of claim 8, wherein the top coat layer in each of the laminate assemblies includes one or more colorants dispersed within the top coat layer.

16. A method comprising:
    for each of first and second laminate assemblies, obtaining a carrier layer having printable surfaces;
    for each of the first and second laminate assemblies, applying a top coat layer to the carrier layer;
    for each of the first and second laminate assemblies, applying an adhesive layer;
    for each of the first and second laminate assemblies, laminating the carrier layer and the top coat layer to a colored core using the adhesive layer,
    wherein the colored cores of the first and second laminate assemblies have a first color and one or more of the adhesive or the top coat layer in each of the first and second laminate assemblies includes a colorant of a second color that is different from the first color of the colored core such that the first color of the colored cores are not visible through the printed surfaces of the top coat layers.

17. The method of claim 16, further comprising dispersing one or more colorants within the adhesive layer.

18. The method of claim 16, further comprising dispersing one or more colorants within the top coat layer.

19. The method of claim 16, further comprising coupling the first laminate assembly with the second laminate assembly.

* * * * *

(12) EX PARTE REEXAMINATION CERTIFICATE (11770th)
United States Patent
Szumski et al.

(10) Number: US 9,868,272 C1
(45) Certificate Issued: Dec. 11, 2020

(54) CARD ASSEMBLY AND METHOD OF MANUFACTURING THE SAME

(71) Applicant: Illinois Tool Works Inc., Glenview, IL (US)

(72) Inventors: Daniel M. Szumski, Saint John, IN (US); Roger Strasemeier, Sauk Village, IL (US)

(73) Assignee: ILLINOIS TOOL WORKS INC., Glenview, IL (US)

Reexamination Request:
No. 90/014,432, Jan. 17, 2020

Reexamination Certificate for:
Patent No.: 9,868,272
Issued: Jan. 16, 2018
Appl. No.: 14/853,393
Filed: Sep. 14, 2015

Related U.S. Application Data (60) Provisional application No. 62/057,462, filed on Sep. 30, 2014.

(51) Int. Cl.
*B32B 27/20* (2006.01)
*B42D 25/23* (2014.01)
*B42D 25/351* (2014.01)
*B42D 25/47* (2014.01)
*B42D 25/475* (2014.01)
*B32B 7/12* (2006.01)
*B32B 27/08* (2006.01)
*B32B 37/12* (2006.01)
*B32B 37/14* (2006.01)
*G06K 19/077* (2006.01)

(52) U.S. Cl.
CPC ............ *B32B 27/20* (2013.01); *B32B 7/12* (2013.01); *B32B 27/08* (2013.01); *B32B 37/12* (2013.01); *B32B 37/14* (2013.01); *B42D 25/23* (2014.10); *B42D 25/351* (2014.10); *B42D 25/47* (2014.10); *B42D 25/475* (2014.10); *G06K 19/07722* (2013.01); *B32B 2307/4026* (2013.01); *B32B 2425/00* (2013.01)

(58) Field of Classification Search
None
See application file for complete search history.

(56) References Cited

To view the complete listing of prior art documents cited during the proceeding for Reexamination Control Number 90/014,432, please refer to the USPTO's public Patent Application Information Retrieval (PAIR) system under the Display References tab.

*Primary Examiner* — Jalatee Worjloh (57) ABSTRACT

A laminate assembly and method for manufacturing a laminate assembly for a card assembly is provided. The assembly includes a top coat layer, a carrier layer connected with the top coat layer, and a colored core coupled by an adhesive layer. One or more of the adhesive layer or the top coat layer includes a colorant of a second color that is different from the first color of the colored core such that the first color of the colored core less not visible through the printed surface of the top coat layer.

US 9,868,272 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4, 8, 9 and 11-18 are determined to be patentable as amended.

Claims 3, 5-7, 10 and 19, dependent on an amended claim, are determined to be patentable.

New claims 20-25 are added and determined to be patentable.

1. A laminate assembly for a card assembly, the laminate assembly comprising:
a top coat layer;
a carrier layer connected with the top coat layer; *and*
a colored core of a first color coupled by an adhesive layer to the carrier layer, wherein one or more of the adhesive layer or the top coat layer includes a colorant of a second color that is different from the first color;
wherein the first color of the colored core is not visible through a printed surface of the top coat layer; and
wherein a sum of a *first* thickness dimension of the top coat layer and a *second* thickness dimension of the adhesive layer is no greater than one and a half mils along a side of the laminate assembly.

2. The laminate assembly of claim 1, further comprising an overlay layer on the top coat layer, wherein a *third* thickness dimension of the colored core, the carrier layer, the adhesive layer, and the top coat layer is thirty-three mils or less.

4. The laminate assembly of claim 1, wherein the colored core has a *third* thickness dimension that is no larger than thirty mils.

8. A card assembly comprising:
plural laminate assemblies coupled with each other; and
a circuit layer disposed between the laminate assemblies, the circuit layer including one or more electronic circuits, wherein each of the laminate assemblies comprises:
a top coat layer;
a carrier layer connected with the top coat layer; and
a colored core of a first color coupled with an adhesive layer to the carrier layer, wherein one or more of the adhesive *layer* or the top coat layer includes a colorant of a second color that is different from the first color of the colored core such that the first color of the colored core is less visible through [the] *a* printed surface of the top coat layer compared to [a] *another* laminate assembly having the top coat layer, the carrier layer, the colored core [layer], and the adhesive *layer* without the colorant being included in the adhesive layer or the top coat layer.

9. The card assembly of claim 8, wherein one or more of the adhesive *layer* or the top coat layer has a thickness dimension that is no greater than one and a half mils.

11. The card assembly of claim 8, wherein the colored core in each of the laminate assemblies *that are coupled with each other* includes one or more of polyvinyl chloride (PVC), polyethylene terephthalate (PET), polycarbonate (PC), polyethylene terephthalate glycol-modified (PETG), or polyactide (PLA).

12. The card assembly of claim 8, wherein the colored core in each of the laminate assemblies *that are coupled with each other* has a thickness dimension that is no larger than thirty mils.

13. The card assembly of claim 8, wherein the adhesive layer in each of the laminate assemblies *that are coupled with each other* is formed from one or more of a polyurethane dispersion (PUD), an acrylic material, a vinyl material, or another polymer.

14. The card assembly of claim 8, wherein the adhesive layer in each of the laminate assemblies *that are coupled with each other also* includes [one or more colorants] *the colorant of the second color* dispersed within the adhesive layer.

15. The card assembly of claim 8, wherein the top coat layer in each of the laminate assemblies *that are coupled with each other* includes [one or more colorants] *the colorant of the second color* dispersed within the top coat layer.

16. A method comprising:
for each of first and second laminate assemblies, obtaining a carrier layer having a printable [surfaces] *surface*;
for each of the first and second laminate assemblies, applying a top coat layer to the carrier layer;
for each of the first and second laminate assemblies, applying an adhesive layer;
for each of the first and second laminate assemblies, laminating the carrier layer and the top coat layer to a colored core using the adhesive layer,
wherein the colored cores of the first and second laminate assemblies have a first color and one or more of the adhesive *layer* or the top coat layer in each of the first and second laminate assemblies includes a colorant of a second color that is different from the first color of the colored core such that the first color of the colored cores [are] *is* not visible through the printed surfaces [of the top coat layers].

17. The method of claim 16, further comprising dispersing [one or more colorants] *the colorant of the second color* within the adhesive [layer] *layers*.

18. The method of claim 16, further comprising dispersing [one or more colorants] *the colorant of the second color* within the top coat [layer] *layers*.

*20. The laminate assembly of claim 1, further comprising:
a tie coat layer disposed between and coupled with the carrier layer and the adhesive layer.*

*21. The laminate assembly of claim 20, wherein the top coat layer includes the colorant of the second color inside a thickness of the top coat layer between opposite exterior sides of the top coat layer, the carrier layer includes a printable polymer coating, and the adhesive layer includes the colorant of the second color inside a thickness of the adhesive layer between opposite exterior sides of the adhesive layer.*

*22. The card assembly of claim 8, wherein each of the laminate assemblies includes a tie coat layer disposed between and coupled with the carrier layer and the adhesive layer.*

*23. The card assembly of claim 22, wherein the top coat layer in each of the laminate assemblies includes the colorant of the second color inside a thickness of the top coat layer between opposite exterior sides of the top coat layer, the carrier layer in each of the laminate assemblies includes a printable polymer coating, and the adhesive layer in each*

*of the laminate assemblies includes the colorant of the second color inside a thickness of the adhesive layer between opposite exterior sides of the adhesive layer.*

*24. The method of claim 16, further comprising:*

*for each of the first and second laminate assemblies, applying a tie coat layer to the adhesive layer, wherein the carrier layer and the top coat layer in each of the first and second laminate assemblies is laminated to the tie coat layer.*

*25. The method of claim 24, wherein the top coat layer in each of the first and second laminate assemblies includes the colorant of the second color inside a thickness of the top coat layer between opposite exterior sides of the top coat layer, the carrier layer in each of the first and second laminate assemblies includes a printable polymer coating, and the adhesive layer in each of the first and second laminate assemblies includes the colorant of the second color inside a thickness of the adhesive layer between opposite exterior sides of the adhesive layer.*

\* \* \* \* \*